(12) United States Patent
Ciano et al.

(10) Patent No.: US 11,048,920 B2
(45) Date of Patent: *Jun. 29, 2021

(54) REAL-TIME MODIFICATION OF PRESENTATIONS BASED ON BEHAVIOR OF PARTICIPANTS THERETO

(71) Applicant: International Business Machines Corporation, Armonk, NY (US)

(72) Inventors: Giuseppe Ciano, Rome (IT); Gianluca Della Corte, Rome (IT); Giuseppe Longobardi, Naples (IT); Antonio Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/810,354

(22) Filed: Nov. 13, 2017

(65) Prior Publication Data

US 2019/0147230 A1    May 16, 2019

(51) Int. Cl.
*G06K 9/00* (2006.01)
*G10L 25/84* (2013.01)
(Continued)

(52) U.S. Cl.
CPC ....... *G06K 9/00335* (2013.01); *G06F 40/166* (2020.01); *G06F 40/194* (2020.01);
(Continued)

(58) Field of Classification Search
CPC ............ G06K 9/00335; G06K 9/00718; G06F 17/2211; G06F 17/24; G10L 25/84; G10L 25/51
See application file for complete search history.

(56) References Cited

U.S. PATENT DOCUMENTS 9,100,685 B2   8/2015 Conrad et al.
9,582,167 B2   2/2017 Livingston et al.
(Continued)

OTHER PUBLICATIONS

Method and System for Context Adaptive Presentation Charts Using Semantic Annotation, IP.com Disclosure No. IPCOM000245743D, Publication Date: Apr. 4, 2016, Retrieved from Internet: URL:http://priorart.ip.com/IPCOM/000245743, 1 page.

(Continued)

*Primary Examiner* — Kavita Stanley
*Assistant Examiner* — William Wong
(74) *Attorney, Agent, or Firm* — Schmeiser, Olsen & Watts, LLP; Aaron Pontikos

(57) ABSTRACT

A computer system, computer program product, method for modifying a presentation based on a behavior of a plurality of participants includes monitoring at least part of the plurality of participants to the presentation by sensing a behavior information relating to a behavior of the plurality of participants during the presentation, interpreting the behavior information to determine one or more behavior indicators of the behavior of the plurality of participants, determining an interest indicator of an interest of the plurality of participants during the presentation, according to the behavior indicators, determining a suggestion for conducting the presentation according to the interest indicator, and outputting an indication of the suggestion to a presenter of the presentation for use by the presenter to conduct the presentation.

11 Claims, 4 Drawing Sheets

(51) Int. Cl.
   *G06F 40/166*   (2020.01)
   *G06F 40/194*   (2020.01)
   *G10L 25/51*    (2013.01)

(52) U.S. Cl.
   CPC ......... *G06K 9/00718* (2013.01); *G10L 25/84* (2013.01); *G10L 25/51* (2013.01)

(56) References Cited

U.S. PATENT DOCUMENTS

| | | | |
|---|---|---|---|
| 2002/0073417 A1* | 6/2002 | Kondo | H04N 7/002 725/10 |
| 2003/0044021 A1* | 3/2003 | Wilkinson | A61B 5/0002 381/56 |
| 2004/0117815 A1* | 6/2004 | Kondo | G10L 17/26 725/12 |
| 2008/0046910 A1* | 2/2008 | Schultz | H04N 21/6582 725/12 |
| 2008/0097949 A1* | 4/2008 | Kelly | H04N 7/163 706/52 |
| 2008/0319973 A1* | 12/2008 | Thambiratnam | G06F 16/313 |
| 2009/0138332 A1 | 5/2009 | Kanevsky et al. | |
| 2009/0138554 A1* | 5/2009 | Longobardi | G06Q 10/10 709/204 |
| 2009/0183210 A1* | 7/2009 | Andrade | H04N 21/44204 725/87 |
| 2011/0154266 A1* | 6/2011 | Friend | A63F 13/06 715/863 |
| 2011/0295392 A1* | 12/2011 | Cunnington | H04N 7/15 700/90 |
| 2013/0036200 A1* | 2/2013 | Roberts | H04L 65/1093 709/219 |
| 2013/0145385 A1* | 6/2013 | Aghajanyan | H04N 21/251 725/10 |
| 2015/0052440 A1* | 2/2015 | Livingston | G06F 3/04845 715/732 |
| 2015/0193089 A1 | 7/2015 | Berlin et al. | |
| 2015/0379341 A1* | 12/2015 | Agrawal | G06T 7/11 382/176 |
| 2016/0170956 A1 | 6/2016 | Allen et al. | |
| 2016/0217343 A1* | 7/2016 | Hoffman | G06K 9/6218 |
| 2016/0266864 A1 | 9/2016 | Rajendran et al. | |
| 2016/0285929 A1* | 9/2016 | Oganezov | H04L 65/403 |
| 2018/0349450 A1* | 12/2018 | Smyth | G06F 3/0482 |

OTHER PUBLICATIONS

System for Measuring an Audience's Sentiment to a Given Slide or Presentation and Modifying the Subsequent Slides Based on That Sentiment, IP.com Disclosure No. PCOM000247497D, Publication Date: Sep. 9, 2016, Retrieved from Internet: URL: http://priorart.ip.com/IPCOM/000247497, 1 page.

Murphy, Jason A. ; List of IBM Patents or Patent Applications Treated as Related; Dec. 17, 2020; 1 page.

* cited by examiner

REAL-TIME MODIFICATION OF PRESENTATIONS BASED ON BEHAVIOR OF PARTICIPANTS THERETO

TECHNICAL FIELD

The present invention relates to managing presentations and more specifically embodiments of modifying presentation based on a behavior of a participant.

BACKGROUND

Presentations are commonly used to deliver contents by at least one person, such as a presenter speaking to other persons or participants defining an audience thereof. The presentations may be aimed at delivering any type of information for different purposes, for example, to inform, teach and/or persuade the participants.

SUMMARY

A computer system, computer program product, method for modifying a presentation based on a behavior of a plurality of participants is provided. A processor of a computing system monitors at least part of the plurality of participants to the presentation by sensing a behavior information relating to a behavior of the plurality of participants during the presentation. The behavior information is interpreted to determine one or more behavior indicators of the behavior of the plurality of participants. An interest indicator of an interest of the plurality of participants is determined during the presentation, according to the behavior indicators. A suggestion for conducting the presentation according to the interest indicator is determined, and an indication of the suggestion is outoutted to a presenter of the presentation for use by the presenter to conduct the presentation.

DETAILED DESCRIPTION

Presentations can be of multi-media type, wherein the delivering of the contents in speech form is complemented by other forms thereof, such as video images. For this purpose, any presentation is generally accompanied by a slideshow. A slideshow may include a series of slides having still or animated video images displayed, for example, on a display controlled by a computer running a presentation software, in a prearranged sequence while the presenter is speaking. The slides may summarize the relevant points of current topics of the presentation. The slideshow helps both the presenter to remember the presenter's ideas and the participants to grasp them. In this context, a feedback of the participants to any presentation may be collected to obtain information about the participant's reaction thereto. For this purpose, a polling system can be used to collect the feedback of the participants. Particularly, the feedback may be collected offline at an end of the presentation to improve the presentation for next sessions thereof. For example, hard-copy questionnaires are delivered to the participants after the presentation has been concluded, asking the participants to respond to a series of questions determining the participants' feedback.

Moreover, audience response devices based on either dedicated devices or personal devices such as smartphones are available to create interactivity between the presenter and the participants. The audience response systems may also be used to collect the feedback in real-time during the presentation. For example, the participants are requested to set a feedback indicator measuring the interest thereof continually on the corresponding audience response devices. The same result may also be achieved with a camera that captures images of the participants provided with cards selected by them to express the participants' feedback.

In this way, the presenter may tailor the presentation on the fly according to the reaction of the participants, for example, by moving quickly to another topic when the interest of the participants is low or insisting on the same topic when the interest is high. Particularly, the feedback may be used to rank the contents and then the slides for selecting different display paths thereof accordingly. However, the collection of the feedback requires explicit actions by the participants to the presentation, which may be quite annoying for the participants.

Figure 1A:
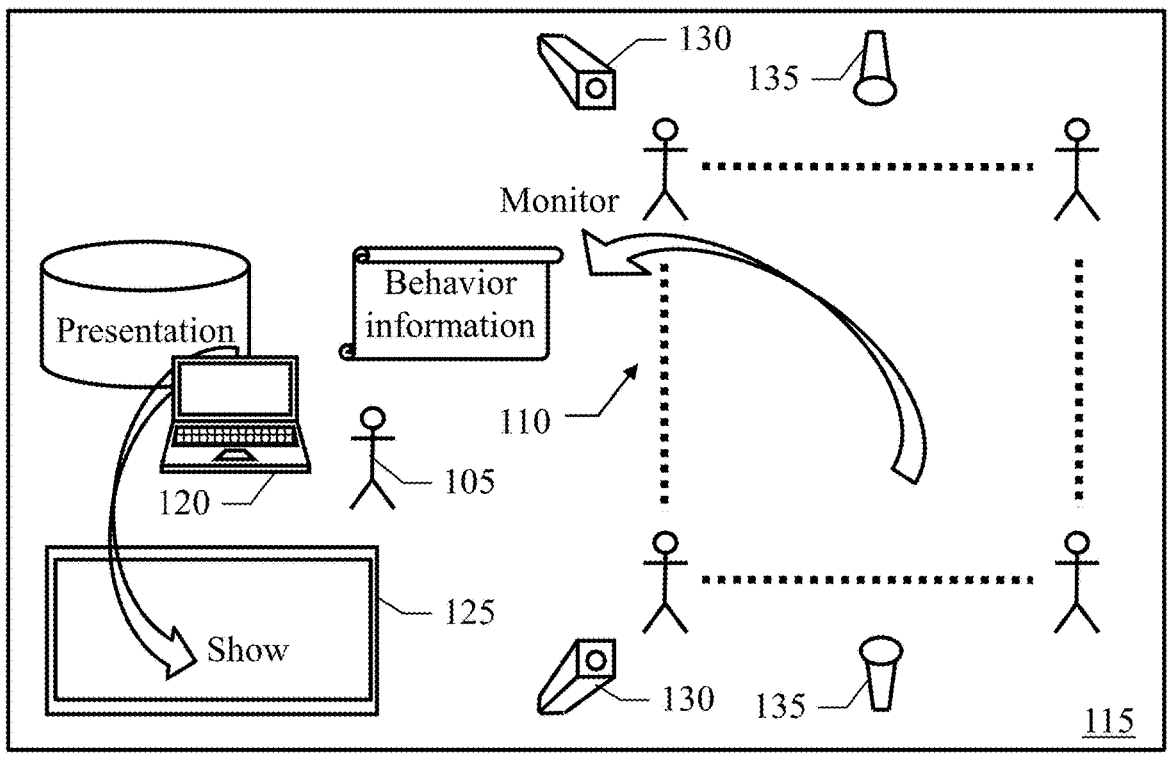
FIG. 1A depicts a first schematic diagram of a participant monitoring system, in accordance with embodiments of the present invention.

Therefore, some participants may be unwilling to provide feedback or the participants may become unwilling during the presentation, and then stop providing feedback after some time during the presentation. I this case, the collected feedback may misrepresent the actual interest of the participants, with the risk of acting in counterproductive way (i.e., abandoning interesting topics or insisting on non-interesting topics). Accordingly, the actions performed by the participants to provide feedback during the presentation may distract the participants from the presentation, with the risk of missing some contents thereof. All of the above may reduce the effectiveness of the presentation. With reference in particular to FIG. 1A-FIG. 1D, the general principles are shown of the solution according to an embodiment of the present disclosure. FIG. 1A depicts a first schematic diagram of a participant monitoring system, in accordance with embodiments of the present invention. Shown in FIG. 1A, a presenter 105 conducts a presentation as usual. Particularly, the presenter 105 speaks to a group of participants 110 to the presentation that are together in a corresponding location 115. Embodiments of location 115 may be a conference room, a classroom, an auditorium, a theater, a movie theater, a gymnasium, a stadium, and any venue that may accommodate a presenter and a plurality of participants. For this purpose, the presenter 105 may use a computer 120 running a presentation software for controlling a slideshow involving the display of a series of slides onto a display 125. The slides may be displayed while the presenter is speaking.

In an exemplary embodiment, the participants 110, or at least part thereof, may be monitored by sensing behavior information relating to the participant's behavior during the presentation. The participants may provide a corresponding authorization prior to monitoring. The participants 110 may be monitored by one or more cameras 130 that collect video images of the participants 110 and one or more microphones 135 that collect audio signals relating to the participants 110. The cameras 130 and microphones 135 may be connected to each other over a network to communicate with each other and other sensors placed in the location 115 for verifying participant information.

Figure 1B:
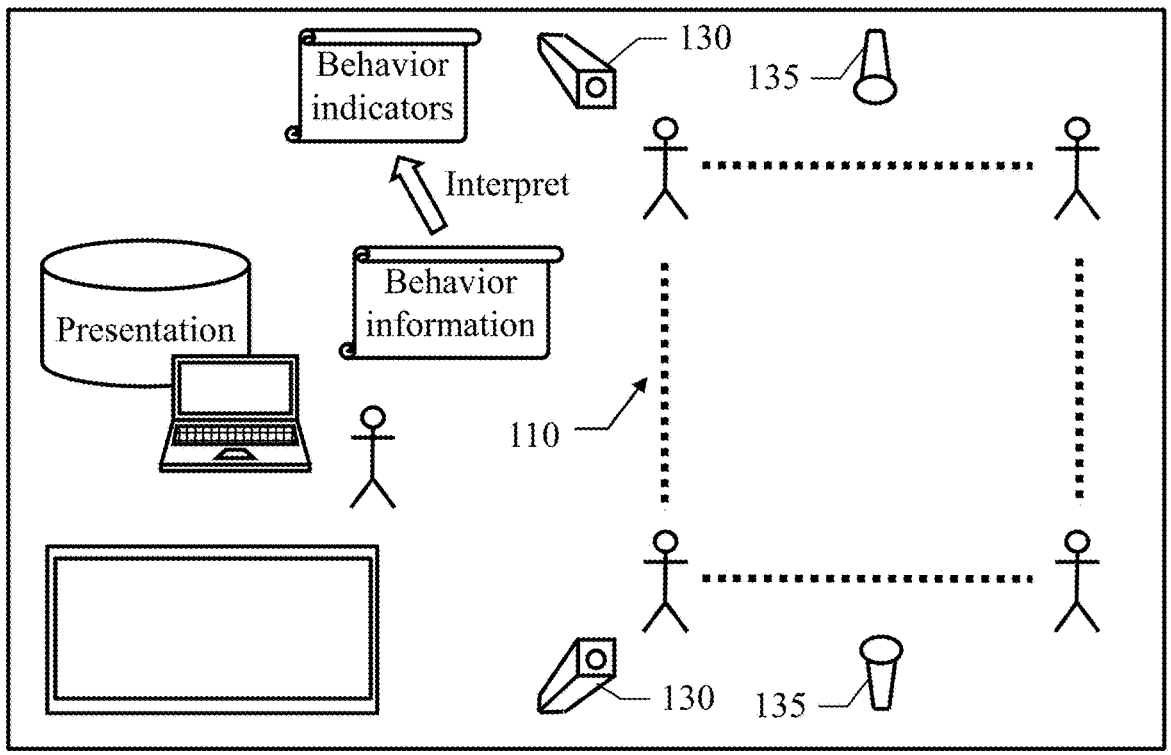
FIG. 1B depicts a second schematic diagram of a participant monitoring system, in accordance with embodiments of the present invention.

FIG. 1B depicts a second schematic diagram of a participant monitoring system, in accordance with embodiments of the present invention. As shown in FIG. 1B, the behavior information is interpreted to determine one or more indicators or behavior indicators of a behavior of the participants 110. For instance, the behavior indicators comprise a number of the participants 110 that are actually looking at the presentation, a number of the participants 110 that are talking, a number of the participants 110 that are using corresponding personal computing devices, such as smartphones, cellphones, tablet computers, etc., not shown in FIG. 1B), a number of the participants 110 that are sleeping and a number of the participants 110 that are yawning for the behavior information collected by the cameras 130 and the detection of a silence condition, a noise condition, an applause condition and a whistle condition for the behavior information collected by the microphones 135.

Figure 1C:
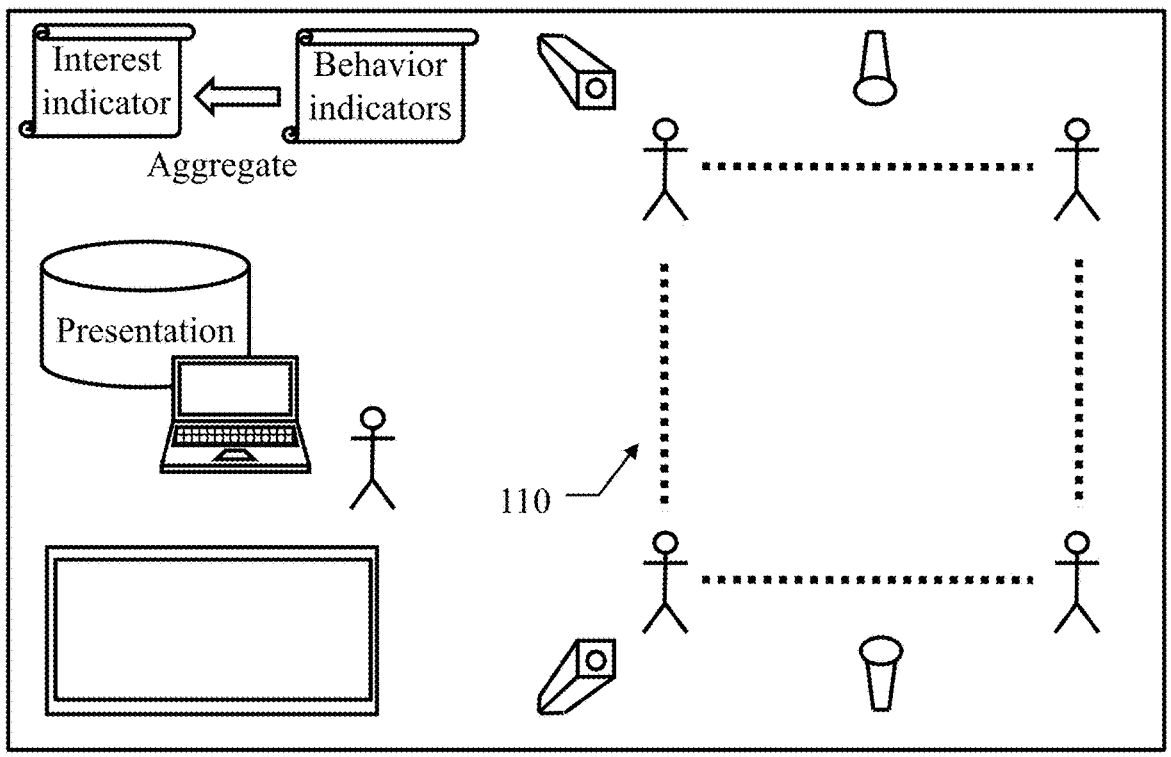
FIG. 1C depicts a third schematic diagram of a participant monitoring system, in accordance with embodiments of the present invention.

FIG. 1C depicts a third schematic diagram of a participant monitoring system, in accordance with embodiments of the present invention. As shown in FIG. 1C, an interest indicator of an interest of the participants 110 during the presentation is determined according to the behavior indicators. For instance, the interest indicator is calculated by aggregating the behavior indicators weighted according to their relevance.

Figure 1D:
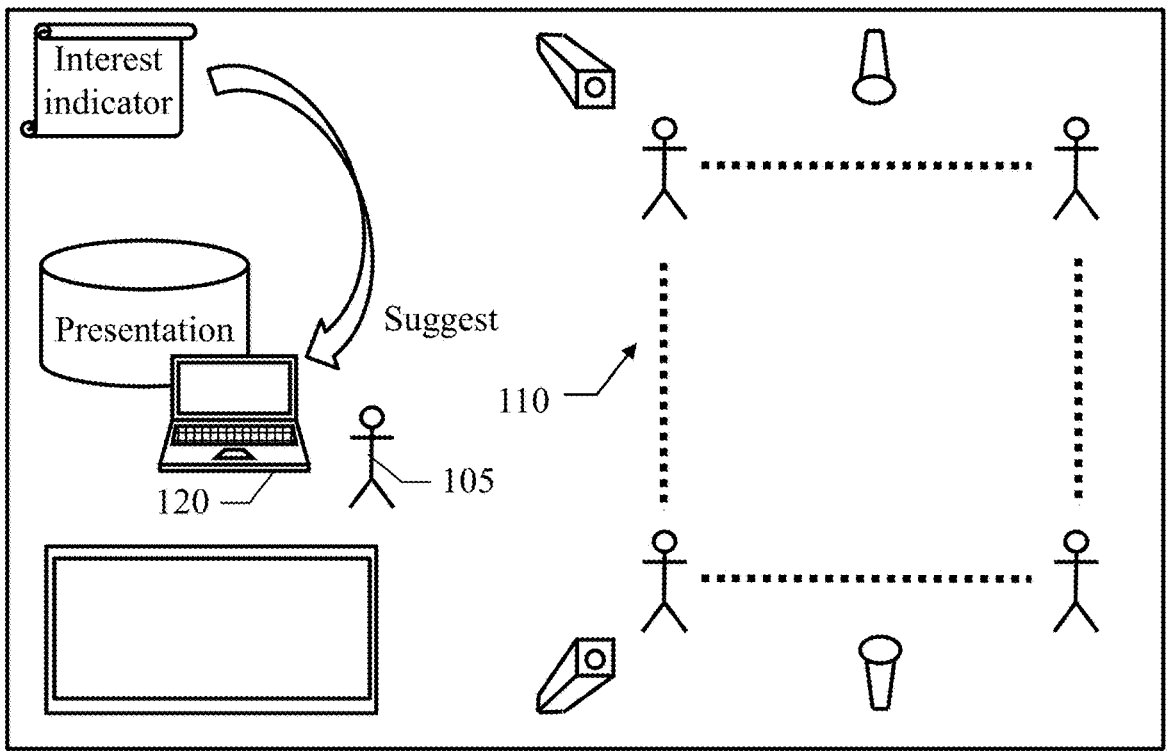
FIG. 1D depicts a fourth schematic diagram of a participant monitoring system, in accordance with embodiments of the present invention.

FIG. 1D depicts a fourth schematic diagram of a participant monitoring system, in accordance with embodiments of the present invention. As shown in FIG. 1D, a suggestion for conducting the presentation is determined according to the interest indicator. For example, when the interest indicator defines a high interest of the participants 110 the suggestion is to continue with new slides that are similar to a current slide that is displayed at the moment, conversely, when the interest indicator defines a low interest of the participants 110 the suggestion is to switch to new slides similar to previous slides that have caused a high interest. An indication of the suggestion is then output to the presenter 105, for example, onto a monitor of the computer 120, for use to conduct the presentation accordingly.

In this way, it is possible to collect a feedback of the participants to the presentation in real-time as defined by the interest indicator, so as to allow the presenter to tailor the presentation on the fly accordingly to the reaction of the participants, without requiring any explicit actions by them. Therefore, the interest indicator accurately tracks the actual interest of the participants during the presentation because the interest indicator is independent of the participants' willingness to provide the feedback, which reduces the risk of acting in a counterproductive way according to wrong suggestions.

In any case, the above-described solution may not cause any distraction to the participants, with reduced risks of missing some contents of the presentation. All of the above may significantly increase an effectiveness of the presentation.

Figure 2:
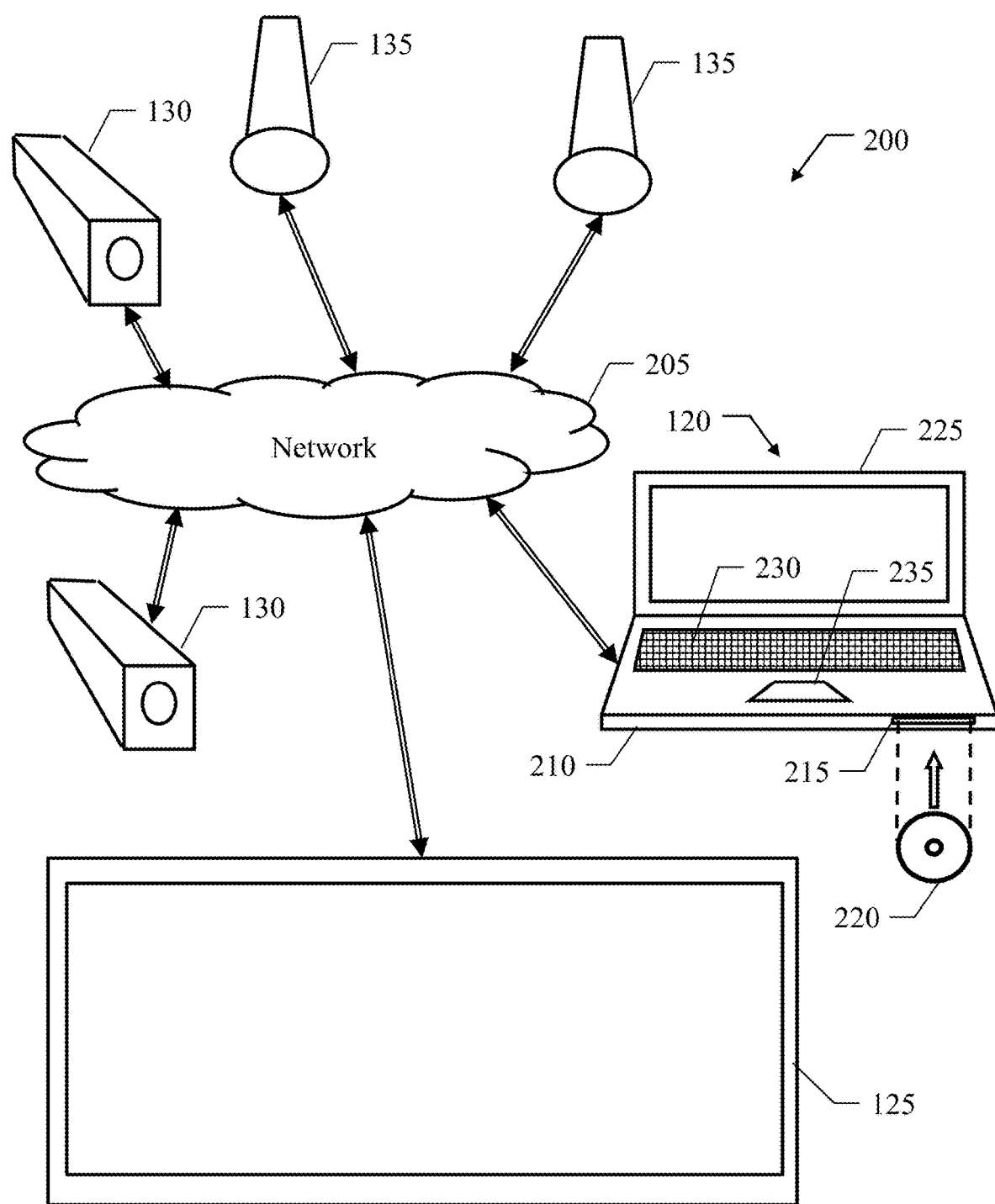
As shown in FIG. 2 depicts a schematic block diagram of a computing system, in accordance with embodiments of the present invention.

With reference now to FIG. 2, which depicts a schematic block diagram of a computing system 200, in accordance with embodiments of the present invention.

The computing system 200 may comprise the computer 120, the display 125, the cameras 130 and the microphones 135, and other sensors that may capture participant data. The computer 120, the display 125, the camera(s) 130, and the microphone(s) 135 can be connected to a communication network 205, for example, a LAN, for communicating among them.

Embodiments of the computer 120 may be a computing device, such as a laptop computer, desktop computer, tablet computer, tablet laptop combination computer, a smart phone, or similar computing device. The computer 120 may include a base 210, which houses the electronic circuits controlling the computer's operation, which are not visible in FIG. 2. These electronic circuits may comprise one or more microprocessors, a non-volatile memory (ROM) storing basic code for a bootstrap of the computer 120, a volatile memory (RAM) used as a working memory by the microprocessors, a hard-disk implementing a mass memory of the computer 120 and a wireless network adapter, for example, of the WI-FI type, for connecting the computer 120 to the communication network 205. In an exemplary embodiment, the electronic circuits are implemented by integrated components mounted on a motherboard and on daughter boards plugged thereon. The base 210 may also be provided with a drive 215 for reading/writing removable storage units 220, for example, optical disks like DVDs, etc. A monitor 225 used to display images on a screen thereof may be hinged to the base 210; in this way, the monitor 225 may be open while in use and folded down onto the base 210 at rest. Operation of the computer 120 can be controlled by means of a keyboard 230 and a touch-pad 235, which are integrated in the base 210.

Figure 3:
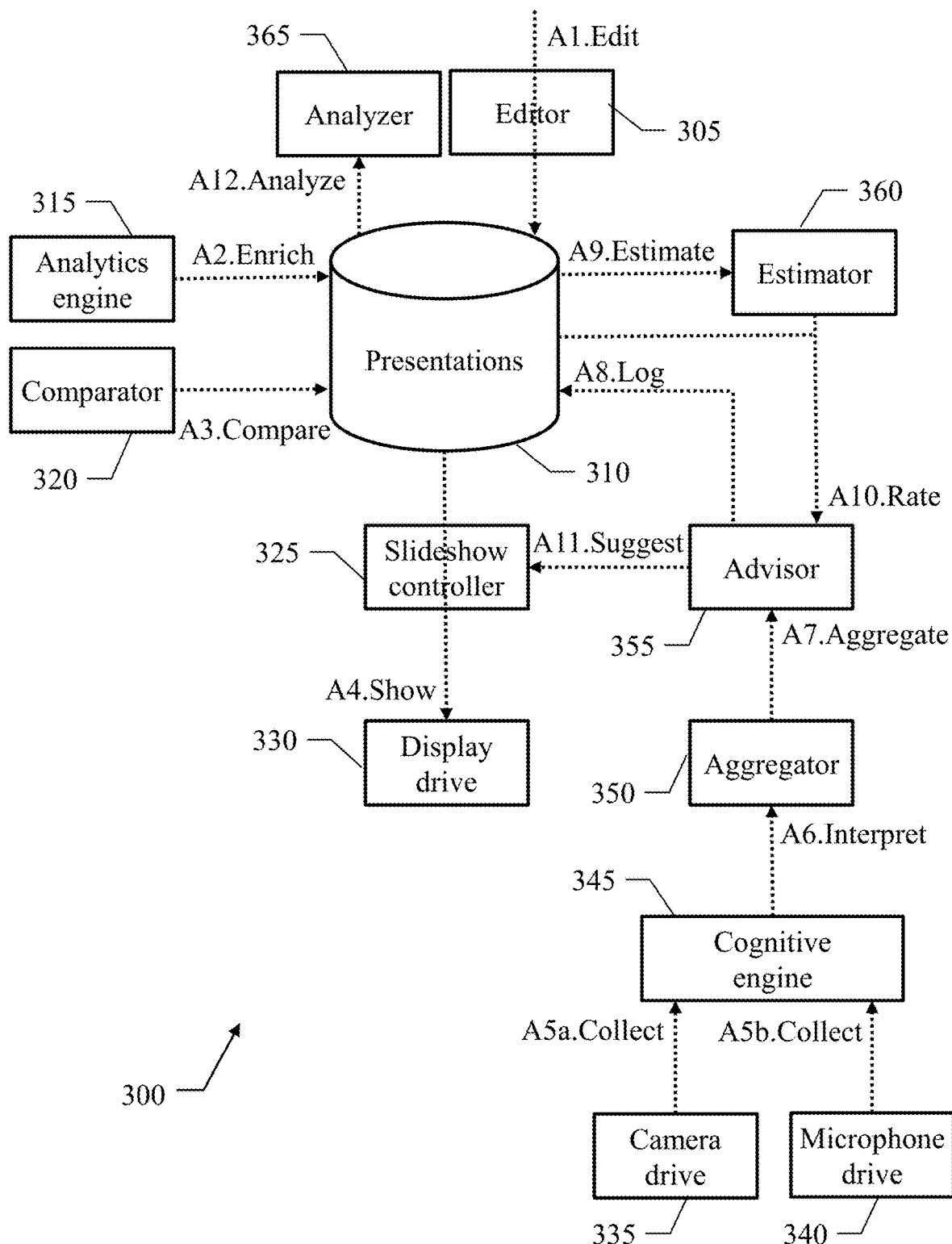
FIG. 3 depicts a collaboration diagram representing the roles of the main software components, in accordance with embodiments of the present invention.

With reference now to FIG. 3, which depicts a collaboration diagram representing the roles of the main software components, in accordance with embodiments of the present invention Embodiments of the software components (e.g. programs and data) are denoted as a whole with the reference 300. The software components may be stored in the mass memory and loaded (e.g. at least partially) into the working memory of the computer when the programs are running, together with an operating system and other application programs not shown in FIG. 3. The programs may be initially installed into the mass memory, for example, from removable storage units or from the communication network. In this respect, each program may be a module, segment or portion of code, which comprises one or more executable instructions for implementing the specified logical function. Particularly, the diagram represents both the static structure of the software components 300 and their dynamic behavior by means of a series of exchanged messages, each one representing a corresponding action (i.e. denoted with sequence numbers preceded by the symbol "A").

In an exemplary embodiment, an editor 305 of a presentation software can be used to edit any presentation to be conducted. The editor 305 allows the presenter to create a new presentation or to update/delete a pre-existing presentation; particularly, the presenter defines the slides of the presentation, each one composed of text and/or images with possible animated effects for their emergence, and arranges at least part of the slides into a presentation sequence with possible animated effects for transitions between slides, whereas any other slides remain available for in-depth explanations. The editor 305 saves a definition of each presentation into a corresponding file of a presentation repository 310 (i.e. action "A1.Edit").

In an exemplary embodiment, an analytics engine 315 may be used to discover one or more characteristics of each slide of the presentations by applying one or more analytics techniques. For example, the characteristics of the slide indicate the slide's content, such as overview, user-interface, architecture, costs, benefits for a presentation relating to a software application, layout, such as text only, images only, text and images with different look-and-feel, and target (e e.g., marketing persons, users, specialists, sales persons, managers), defined by corresponding codes selected in a pre-defined vocabulary. The analytics engine 315 enriches the file of each presentation in the presentation repository 310 with metadata indicative of the characteristics of the presentation's slides (i.e. action "A2.Enrich"). Moreover, a comparator 320 may be used to compare the slides of each presentation; particularly, the comparator 320 calculates a similarity index (e.g. ranging from 0 to 1 in increasing order of similarity) between each pair of slides of the presentation according to characteristics of the slides (e.g. defined as a percentage of common characteristics). The comparator 320 may add further metadata to the file of each presentation in the presentation repository 310 containing a matrix of the similarity indexes of all the presentations slides (i.e. action "A3.Compare").

In an exemplary embodiment, a slideshow controller 325 of the same presentation software may be used to run a current session of each presentation according to corresponding commands entered in a dashboard thereof. For instance, the slideshow controller 325 extracts the presentation from the corresponding file in the presentation repository 310 and controls a display drive 330 to display the presentation's first slide in the presentation sequence onto the display. The presenter then controls the change of the slides so as to cause the display drive 330 to display the slides in succession onto the display with the possible animated effects of the slide's transitions. For instance, the presenter may move forward/backward along the presentation sequence or may jump to any slide, including slides not comprised in the presentation sequence. Moreover, in each slide the presenter may control the emergence of the slide's text/images in succession with the slide's possible animated effects (i.e. action "A4. Show").

In an exemplary embodiment, during the presentation a camera drive 335 may continually collect video images of the location (e.g. every 0.1-2 seconds) that are acquired by the cameras shooting different groups of the participants in front of the cameras (i.e. action "A5a.Collect"). At the same time, a microphone drive 340 may continually collect audio signals of the location (e.g. every 0.1-2 seconds) that are acquired by the microphones listening at different points thereof (i.e. action "A5b.Collect"). A cognitive engine 345 may receive the video images and the audio signals that are collected at every (collection) instant by the camera drive 335 and by the microphone drive 340, respectively, defining the corresponding behavior information. Other sensors may be used to collect behavior information, which may be combined with the data returned from the camera drive 335 and the microphone drive 340. The cognitive engine 345 may interpret a meaning of the raw and unstructured behavior information by applying cognitive techniques, thereby determining the behavior indicators of the same collection instant. For example, the cognitive engine 345 recognizes human faces of the participants and any personal computing devices in each video image; the cognitive engine 345 then detects any participant that is looking at the presentation when the participant's gaze is directed towards a known position of the presenter/display, any participant that is speaking when the participant's mouth moves significantly, any participant that is using any personal computing device when the participant's gaze is directed towards the personal computing device, any participant that is sleeping when the participant's eyes are closed and any participant that is yawing when the participant's mouth opens completely. The cognitive engine 345 may then calculate the number of the participants that are looking at the presentation, the number of the participants that are speaking, the number of the participants that are using personal computing devices, the number of the participants that are sleeping and the number of the participants that are yawing in all the video images. Moreover, the cognitive engine 345 may perform an intensity/frequency analysis of each audio signal; the cognitive engine 345 then detects the silence condition when the intensity of the audio signal is lower than a silence threshold, a noise condition when the intensity of the audio signal is higher than the silence threshold but lower than a noise threshold that is higher than the silence threshold, the applause condition when the intensity of the audio signal is higher than an applause threshold that is higher than the noise threshold and the whistle condition when the intensity of the audio signal is higher than a whistle intensity threshold and a fundamental frequency of the audio signal is higher than a whistle frequency threshold (i.e. action A6.Interpret).

Furthermore, an aggregator 350 may aggregate the behavior indicators of every collection instant into the corresponding interest indicator. For example, the interest indicator INT may be calculated at first with the following formula:

$$INT = 0.5 + \frac{W_L \cdot N_L - W_S \cdot N_S - W_Y \cdot N_Y - W_D \cdot N_D - W_T \cdot N_T}{2 \cdot N_{TOT}},$$

wherein $N_L$ in the number of the participants that are looking at the presentation and $0<W_L\leq 1$ is a corresponding weight, $N_S$ is the number of the participants that are sleeping and $0<W_S\leq 1$ is a corresponding weight, $N_Y$ is the number of the participants that are yawning and $0<W_Y\leq 1$ is a corresponding weight, $N_D$ is the number of the participants that are using personal computing devices but are not yawning and $0<W_D\leq 1$ is a corresponding weight, $N_T$ is the number of the participants that are talking but are neither yawning nor using personal computing devices and $0<W_T\leq 1$ is a corresponding weight, and $N_{TOT}$ is the total number of the participants to the presentation. Accordingly, the interest indicator ranges from $$INT = 0.5 + \frac{-N_{TOT}}{2 \cdot N_{TOT}} = 0.5 - 0.5 = 0$$

when all the participants are sleeping, yawning, using personal computing devices or talking and the corresponding weights are 1 to $$INT = 0.5 + \frac{N_{TOT}}{2 \cdot N_{TOT}} = 0.5 + 0.5 = 1$$

when all the participants are looking at the presentation and the corresponding weight is 1. The interest indicator INT is then adjusted with the following formulas:

$$INT=INT+(1-INT)\cdot F_S$$

when the silence condition is detected, with $0<F_S\le 1$ a corresponding factor, $$INT=INT+(1-INT)\cdot F_A$$

when the applause condition is detected, with $0<F_A\le 1$ a corresponding factor, $$INT=INT-INT\cdot F_N$$

when the noise condition is detected, with $0<F_N\le 1$ a corresponding factor and $$INT=INT-INT\cdot F_W$$

when the whistle condition is detected, with $0<F_W\le 1$ a corresponding factor. Thus, the interest indicator is increased when the silence condition or the applause condition is detected, whereas the interest indicator is decreased when the noise condition or the whistle condition is detected; however, the interest indicator may always remain within the rage 0-1 (i.e. action A7.Aggregate). The aggregator 350 may log the interest indicator of the current slide into historical information that is associated with the current session of the presentation into the presentation repository 310 (i.e. action A8.Log).

Moreover, an advisor 355 may determine the suggestion for conducting the presentation corresponding to the interest indictor of every collection instant. For example, when the interest indictor is within an acceptable range, between a low interest threshold and a high interest threshold, no action is performed. Conversely, when the interest indicator is possibly strictly lower or lower than the low interest threshold (i.e., when a negative interest condition is detected indicating that the interest of the participants is too low) the advisor 355 controls an estimator 360 to calculate corresponding interest estimates of an expected interest of the participants for new slides that are still to be displayed, as indicated by corresponding display flags that are set by the slideshow controller 325 as soon the slides are displayed. The interest estimate of each new slide is calculated according to the interest indicators of previous slides that have already been displayed, as indicated by the corresponding display flags, taking into account the new slide's similarity indexes with the current slide. For example, the interest estimate is set to the interest indicator of the previous slide having the highest similarity index with the current slide, multiplied by this similarity index (i.e. action A9.Estimate). The advisor 355 may then rank the new slides according to the slides' interest estimates in decreasing order thereof and determine the suggestion for the negative interest condition by selecting the suggested new slides with the higher interest estimates, for example, the first 1-5. When instead the interest indictor is possibly strictly higher or higher than the high interest threshold (i.e., when a positive interest condition is detected indicating that the interest of the participants is very high) the advisor 355 may directly rank the new slides according to the new slide's similarity indexes with the current slide in decreasing order thereof and then determine the suggestion for the positive interest condition by selecting the suggested new slides with the higher similarity indexes, for example, the first 1-5 (i.e. action A10.Rate". At this point, the advisor 355 may notify the suggestion, if any, to the slideshow controller 325; in response thereto, the slideshow controller 325 may output an indication of the suggestion to the presenter, for example, by displaying a corresponding warning into a dashboard with a list of the suggested new slides in decreased order of the slides' selection and additional information relating thereto. For example, slide titles extracted from the presentation repository 310 and slide interest estimates and/or similarity indexes with the current slide may be displayed to the presenter. In this way, when the interest of the participants with respect to the current slide is too low the presenter is suggested to change to possibly different new slides that are expected to increase participant interest, whereas when the interest of the participants with respect to the current slide is very high the presenter is suggested to continue with new slides that are similar to the current one, in any case with the final decision of changing the slides that remains in charge of the presenter (i.e. action A11.Suggest).

After the current session of the presentation has been concluded, the presenter may use an analyzer 365 to analyze the presentation offline according to the presentation's historical information extracted from the presentation repository 310. For example, for each displayed slide of the presentation that has been displayed in one or more previous sessions thereof, the analyzer 365 may calculate a cumulative interest index according to each slide's interest indexes in these previous sessions, such as equal to an average. The analyzer 365 may then determine a suggestion, if any, for each displayed slide in a similar way as above. In an exemplary embodiment, when the cumulative interest indicator of the displayed slide is strictly lower than the low interest threshold, the analyzer 365 ranks the other slides of the presentation, different from the ones preceding the displayed slide in the presentation succession, according to cumulative interest indexes and determines the suggestion by selecting the suggested other slides with the higher interest estimates, conversely, when the cumulative interest indictor of the displayed slide is higher than the high interest threshold, the analyzer 365 ranks the other slides of the presentation, different from the ones preceding the displayed slide in the presentation succession, according to similarity indexes with the displayed slide and determines the suggestion by selecting the suggested other slides with the higher similarity indexes. The presenter may then navigate the presentation by displaying the cumulative interest index and the possible suggested other slides of every displayed slide thereof, so as to tune the presentation accordingly by exploiting the editor 305 in an attempt to improve an effectiveness, for example, by giving more room to the slides having high cumulative interest indexes to the detriment of the slides having low cumulative interest indexes (i.e. action A12.Analyze).

To satisfy local and specific requirements, logical and/or physical modifications and alterations can be applied to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details, such as the numerical values set forth in the preceding description to provide a more thorough understanding thereof; conversely, well-known features may have been omitted or simplified in order not to obscure the description with unnecessary particulars. Moreover, it is expressly intended that specific elements and/or method execution steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range comprising its end points. Moreover, ordinal or other qualifiers are merely used as labels to distinguish elements with the same name but do not by themselves connote any priority, precedence or order. The terms include, comprise, have, contain and involve and any forms thereof should be intended with an open, non-exhaustive meaning (i.e., not limited to the recited items), the terms based on, dependent on, according to, function of and any forms thereof should be intended as a non-exclusive relationship (i.e., with possible further variables involved), the term a/an should be intended as one or more items unless expressly indicated otherwise, and the term means for or any means-plus-function formulation should be intended as any structure adapted or configured for carrying out the relevant function.

For example, an embodiment provides a method for managing a presentation. However, the presentation may be of any type (e.g. a lecture, a workshop, a classroom, a course, a tutorial, a conference, a seminar).

In an embodiment, the method is implemented in a computing system. However, the computing system may be of any type.

In an embodiment, the method comprises monitoring at least part of a plurality of participants to the presentation. However, the participants may be in any number and of any type (e.g. physically present locally or in communication with the presenter remotely) and the participants may be monitored in any way (e.g. all together, at the level of different groups thereof concurrently or in succession).

In an embodiment, the participants are monitored by sensing behavior information relating to a behavior of the participants during the presentation. However, the behavior information may be of any type and sensed in any way (e.g. video images only, audio signals only or any combination thereof that are sensed by any number and type of dedicated/shared sensors).

In an embodiment, the method comprises interpreting the behavior information to determine one or more behavior indicators of the behavior of the participants. However, the behavior indicators may be in any number and of any type (e.g. numbers, levels, flags either in discrete or continuous form) and the behavior indicators may be determined in any way from the behavior information (e.g. with cognitive, artificial intelligence, fuzzy logic techniques, each one from a single type of behavior information or from a combination of different types thereof).

In an embodiment, the method comprises determining an interest indicator of an interest of the participants during the presentation according to the behavior indicators. However, the interest indication may be of any type (e.g. a number measuring the interest or simply a level indicating two or more interest conditions) and it may be determined in any way from the behavior indicators (e.g. at any collection instant or combining the behavior indicators of more collection instants for corresponding periods).

In an embodiment, the method comprises determining a suggestion for conducting the presentation according to the interest indicator. However, the suggestion may be of any type (e.g. indicating suggested new slides or simply suggested topics) and it may be determined in any way (e.g. only when the interest indicator is too low or very high at every collection instant, when this happens for a certain period, always for any value of the interest indicator).

In an embodiment, the method comprises outputting an indication of the suggestion to a presenter of the presentation for use by the presenter to conduct the presentation. However, the suggestion may be provided to the presenter in any way (e.g. with a video and/or audio message, with different priority levels according to the interest indicator) in combination with any other information (e.g. a discrete/continuous representation of the interest indicator during the whole presentation); moreover, the presentation may be conducted according to the suggestion in any way (e.g. manually by the presenter or even automatically by the slideshow controller that directly changes the slides always or only in specific situations, for example, moving to the best suggested new slide when the interest indicator of the current slide falls below a critical threshold).

In an embodiment, the step of monitoring at least part of a plurality of participants comprises collecting one or more video images of at least part of the participants. However, the video images may be in any number and of any type (e.g. still or moving images).

In an embodiment, the interpreting the behavior information comprises interpreting the video images to determine a number of the participants looking at the presentation, a number of the participants talking, a number of the participants using corresponding personal computing devices, a number of the participants sleeping and/or a number of the participants yawning. However, different, additional, alternative behavior indicators or any combination thereof may be determined from the video images.

In an embodiment, the step of monitoring at least part of a plurality of participants comprises collecting one or more audio signals relating to the participants. However, the audio signals may be in any number and of any type (e.g. acquired where the participants sit or where the presenter stands).

In an embodiment, the step of interpreting the behavior information comprises interpreting the audio signals to determine a silence condition, a noise condition, an applause condition and/or a whistle condition. However, different, additional, alternative behavior indicators or any combination thereof may be determined from the audio signals.

In an embodiment, a plurality of slides are stored in the computing system for displaying to the participants during the presentation. However, the slides may be of any type (e.g. containing text, images, sound or any combination thereof, with or without any emergence/transition effects) and arranged in any way (e.g. all of them into the presentation sequence or with some of them outside it) for the slides' displaying of any type (e.g. onto a display or a projector, locally and/or remotely).

In an embodiment, the determining a suggestion comprises determining one or more suggested new slides among new one or more of the slides still to be displayed. However, the suggested new slides may be in any number (e.g. down to a single one) and of any type (e.g. already comprised in the presentation sequence and/or outside the presentation sequence).

In an embodiment, the method comprises calculating corresponding similarity indexes of at least part of the slides with a current one of the slides being currently displayed according to one or more characteristics thereof for use to determine the suggested new slides. However, the similarity indexes may be calculated in any way (e.g. with any formula based on any number and type of characteristics), for any number and type of slides at any time (e.g. before starting the presentation between each pair of slides thereof or during the presentation at each collection instant only between the pairs of slides that are of interest at the moment).

In an embodiment, the method comprises associating corresponding metadata with the slides indicative of the characteristics thereof before starting the presentation. However, the metadata may relate to any number and type of characteristics determined in any way and at any time (e.g. either before starting the presentation or during the presentation, with analytics, artificial intelligence, fuzzy techniques, completely automatically, semi-automatically requiring a selection/confirmation by the presenter or even completely manually by the presenter); in any case, the possibility is not excluded of calculating the similarity indexes directly from the slides, even without associating any metadata therewith.

In an embodiment, the characteristics of each of the slides comprise an indication of a content, a layout and/or a target of the slide. However, different, additional, alternative characteristics or any combination thereof are possible.

In an embodiment, said step of determining one or more suggested new slides comprises the following operations in response to a positive interest condition of the participants to the presentation defined by the interest indicator. However, the positive interest condition may be determined in any way (e.g. immediately when the interest indicator reaches a corresponding threshold or only after this condition persists for a predefined period).

In an embodiment, in response to the positive interest condition the step of determining one or more suggested new slides comprises selecting the suggested new slides among the new slides according to the corresponding similarity indexes. However, the suggested new slides may be selected in any number and in any way (e.g. the better new slides in a predetermined number, only the ones whose similarity indexes reach a predetermined threshold or a combination thereof).

In an embodiment, the step of determining one or more suggested new slides comprises the following operations in response to a negative interest condition of the participants to the presentation defined by the interest indicator. However, the negative interest condition may be determined in any way (e.g. immediately when the interest indicator falls below a corresponding threshold or only after this condition persists for a predefined period).

In an embodiment, in response to the negative interest condition the step of determining one or more suggested new slides comprises calculating corresponding interest estimates of an expected interest of the participants for the new slides with the interest estimate of each of the new slides that is calculated according to the interest indicators of previous one or more of the slides being already displayed and to the similarity indexes of the previous slides with the new slide. However, the interest estimates may be calculated in any way (e.g. according to a combination of the interest indicators of multiple previous slides weighted according to their similarity indexes).

In an embodiment, in response to the negative interest condition the step of determining one or more suggested new slides comprises selecting the suggested new slides among the new slides according to the corresponding interest estimates. However, the suggested new slides may be selected in any number and in any way, either the same or different with respect to their selection in response to the positive interest condition.

In an embodiment, the method comprises logging historical information of one or more previous sessions of the presentation. However, the historical information may be logged at any time (e.g. incrementally during each session of the presentation or cumulatively at the end thereof) and the historical information may relate to any number of previous sessions (e.g. all of them or only the most recent ones, for the same version of the presentation or for any versions thereof).

In an embodiment, for each of the previous sessions of the presentation the historical information comprises the interest indicators of displayed one or more of the slides being displayed during the previous session of the presentation. However, different, additional, alternative pieces of information or any combination thereof may be logged down to none.

In an embodiment, the method comprises analyzing the presentation offline according to the historical information. However, the presentation may be analyzed in any way (e.g. by simply displaying corresponding information and/or suggestions, automatically determining changes to the presentation sequence and suggesting them for approval); in any case, this operation may also be omitted at all in a simplified implementation.

Generally, similar considerations apply if the same solution is implemented with an equivalent method by using similar execution steps with the same functions of more execution steps or portions thereof, removing some execution steps being non-essential, or adding further optional execution steps; moreover, the execution steps may be performed in a different order, concurrently or in an interleaved way, at least in part.

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (e.g. the presentation software) or even directly in the latter; moreover, the computer program may run on any computing system. In any case, the solution according to an embodiment of the present disclosure lends itself to be implemented even with a hardware structure (e.g. by electronic circuits integrated in one or more chips of semiconductor material), or with a combination of software and hardware suitably programmed or otherwise configured.

An embodiment provides a system comprising means configured for performing each of the execution steps of the above-mentioned method. An embodiment provides a system comprising a circuitry (i.e., any hardware suitably configured, for example, by software) configured for performing each of the execution steps of the same method. However, the computing system may comprise any number and type of computing machines (e.g. of physical and/or virtual type) and the computing system may have any architecture (e.g. stand-alone or distributed with the computing machines communicating among them via any local, wide area, global, cellular or satellite network and exploiting any type of wired and/or wireless connections).

Generally, similar considerations apply if the system has a different structure or comprises equivalent components or the system has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for modifying a presentation based on a behavior of a plurality of participants, the method comprising:

monitoring, by a processor of a computing system, at least part of the plurality of participants to the presentation by sensing a behavior information relating to a behavior of the plurality of participants during the presentation, wherein a plurality of slides are stored in the computing system for displaying to the plurality of participants during the presentation;

interpreting, by the processor, the behavior information to determine one or more behavior indicators of the behavior of the plurality of participants;

determining, by the processor, an interest indicator of an interest of the plurality of participants during the presentation, according to the one or more behavior indicators, wherein the interest indicator is calculated at first with the following formula:

interest indicator (INT)=$0.5+(W_L*N_L-W_S*N_S-W_Y*N_Y-W_D*N_D-W_T*N_T)/(2*N_{TOT})$, wherein $N_L$ is a number of the plurality of participants that are looking at the presentation and $0<W_L\leq1$ is a corresponding weight, $N_S$ is a number of the plurality of participants that are sleeping and $0<W_S\leq1$ is a corresponding weight, $N_Y$ is a number of the plurality of participants that are yawning and $0<W_Y\leq1$ is a corresponding weight, $N_D$ is a number of the plurality of participants that are using personal computing devices but are not yawning and $0<W_D\leq1$ is a corresponding weight, $N_T$ is a number of the plurality of participants that are talking but are neither yawning nor using personal computing devices and $0<W_T\leq1$ is a corresponding weight, and $N_{TOT}$ is a total number of the plurality of participants to the presentation;

determining, by the processor, a suggestion for conducting the presentation according to the interest indicator, the determining the suggestion comprising:

calculating, by the processor, corresponding similarity indexes of at least part of the plurality of slides with a current slide being currently displayed according to one or more characteristics of the plurality of slides to determine one or more suggested new slides that is expected to increase an interest of the plurality of participants; and outputting, by the processor, an indication of the suggestion to a presenter of the presentation for use by the presenter to conduct the presentation.

2. The method according to claim 1, wherein the monitoring comprises:

receiving, by the processor, one or more video images of at least part of the plurality of participants.

3. The method according to claim 2, wherein the interpreting the behavior information comprises:

interpreting, by the processor, the one or more video images to determine a number of the plurality of participants looking at the presentation, a number of the plurality of participants talking, a number of the plurality of participants using corresponding personal computing devices, a number of the plurality of participants sleeping and a number of the plurality of participants yawning.

4. The method according to claim 1, wherein the monitoring comprises:

receiving, by the processor, one or more audio signals relating to the plurality of participants.

5. The method according to claim 4, wherein the interpreting the behavior information comprises:

interpreting, by the processor, the one or more audio signals to determine a silence condition, a noise condition, an applause condition, and a whistle condition.

6. The method according to claim 1, wherein the calculating corresponding similarity indexes comprises:

associating, by the processor, corresponding metadata with the one or more suggested new slides indicative of characteristics of the one or more suggested new slides before starting the presentation.

7. The method according to claim 1, wherein the characteristics of each of the one or more suggested new slides comprise an indication of a content, a layout, and a target.

8. The method according to claim 7, wherein the determining one or more suggested new slides comprises, in response to a negative interest condition of the plurality of participants to the presentation defined by the interest indicator:

calculating, by the processor, corresponding interest estimates of an expected interest of the plurality of participants for the one or more suggested new slides, an interest estimate of each slide of the one or more suggested new slides being calculated according to interest indicators of previous one or more slides being already displayed and to corresponding similarity indexes of previous slides with the one or more suggested new slides, and selecting, by the processor, the one or more suggested new slides among the plurality of slides according to the corresponding interest estimates.

9. The method according to claim 1, wherein the determining one or more suggested new slides comprises, in response to a positive interest condition of the plurality of participants to the presentation defined by the interest indicator:

selecting, by the processor, the one or more suggested new slides among the plurality of slides according to the corresponding similarity indexes.

10. The method according to claim 1, further comprising:

logging, by the processor, historical information of one or more previous sessions of the presentation, for each of the one or more previous sessions of the presentation, the historical information comprising interest indicators of displayed one or more of the slides being displayed during a previous session of the presentation; and analyzing, by the processor, the presentation offline according to the historical information.

11. The method according to claim 1, wherein the interest indicator is adjusted with the following formulas:

$$INT=INT+(1-INT)*F_S$$

when a silence condition is detected with $0<F_S\leq1$ as a corresponding factor, $$INT=INT+(1-INT)*F_A$$

when an applause condition is detected with $0<F_A\leq1$ as a corresponding factor, $$INT=INT-INT*F_N$$

when a noise condition is detected with $0<F_N\leq1$ a corresponding factor and $$INT=INT-INT*F_W$$

when a whistle condition is detected with $0<F_W\leq1$ a corresponding factor.

\* \* \* \* \*